United States Patent [19]
Remo

[11] Patent Number: 5,255,282
[45] Date of Patent: Oct. 19, 1993

[54] OPEN WAVEGUIDE EXCIMER LASER
[75] Inventor: John L. Remo, St. James, N.Y.
[73] Assignee: Quantametrics Inc., St. James, N.Y.
[21] Appl. No.: 796,718
[22] Filed: Nov. 25, 1991
[51] Int. Cl.$^5$ .............................................. H01S 3/097
[52] U.S. Cl. ...................................... 372/82; 372/64; 372/92; 372/83; 372/57; 372/37
[58] Field of Search ...................... 372/82, 64, 87, 83, 372/57, 92, 37

[56] References Cited

U.S. PATENT DOCUMENTS

| Re. 291,103 | 1/1977 | Wilson et al. | 372/83 |
| 3,748,594 | 7/1973 | Pugh | 372/83 |
| 3,815,047 | 6/1974 | Smith et al. | 331/94.5 |
| 4,004,249 | 1/1977 | Kikuchi | 331/94.5 |
| 4,169,251 | 9/1979 | Laakmann | 331/94.56 |
| 4,513,424 | 4/1985 | Waynard et al. | 372/68 |
| 4,631,732 | 12/1986 | Christensen | 372/87 |
| 4,651,325 | 3/1987 | Wang et al. | 372/82 |
| 4,719,639 | 1/1988 | Tulip | 372/82 |
| 4,890,294 | 12/1989 | Nishimae et al. | 372/57 |
| 4,987,577 | 1/1991 | Seunik et al. | 372/64 |

Primary Examiner—Léon Scott, Jr.
Attorney, Agent, or Firm—Stanger, Stempler & Dreyfus

[57] ABSTRACT

A gas laser of the excimer type in which an open waveguide is employed, in which the excimer medium is moved to and through the open waveguide in a direction transverse to the optical axis. A discharge cell is defined by the upper and lower slabs of the open waveguide, and if desired, a microwave source is provided which supplies microwave energy to the discharge cell volume to excite the excimer medium and to initiate discharge.

13 Claims, 2 Drawing Sheets

OPEN WAVEGUIDE EXCIMER LASER

REFERENCE TO CO-PENDING APPLICATIONS

This application relates to the application of John L. Remo and Gerhard Schaefer, Ser. No. 279,674, filed Dec. 5, 1988, entitled Gas Laser With Discharge in 2-Dimensional Waveguide, and assigned to the same assignee as the present application.

BACKGROUND OF THE INVENTION

This invention relates to lasers and in particular to gas lasers of the excimer type.

A gas laser is operated by creating a discharge within a gaseous medium within an optical resonator. The discharge causes an over population of upper energy levels within the medium, and subsequent transition to lower energy levels releases light at discrete frequencies within the resonator to maintain a lasing action. In a typical gas laser, a hollow tube confines the discharge between the mirrors of the optical resonator.

Gas lasers often use hollow optical waveguides to excite the laser medium as well as to remove heat while still maintaining a good beam quality. Alternate reflection of the optical rays from opposing surfaces as the optical rays propagate down the waveguide enhances beam quality. Moreover, losses due to reflection rapidly increase at high angles of incidence. Thus the waveguide selectively discriminates against the oscillation of high-divergence optical modes. This further improves beam quality.

However, the hollow waveguide retains heat and uses mainly the conductivity of the walls to remove heat by conduction. This results in a decrease of the extraction efficiency of the laser.

Such devices also operate at gas pressures below one atmosphere and at relatively low excitation levels. At higher gas pressures and high RF power levels, inhomogeneities and instabilities develop in the gas discharge which limits the utility of the laser. The use of metallic electrodes in contact with the laser gas is undesirable with corrosive gas mixtures, especially gas mixtures of the type used with excimer lasers.

In addition, microwave excitation of the gas medium within a hollow waveguide has been employed, in which the microwave excitation has been along the direction of the optical axis of the hollow waveguide and generally occupies the entire volume of the hollow waveguide. When used with a gaseous medium which occupies the entire volume, or a substantial portion of the volume of the hollow waveguide, it is difficult to adjust and maintain the position of the maximum amplitude of the standing E-field wave that is created. This decreases the efficiency that would otherwise be achievable.

OBJECTS AND SUMMARY OF THE INVENTION

It is an object of the invention to provide a more efficient gas medium laser, particularly of the excimer type.

It is a further object of the invention to provide a gas medium laser, particularly of the excimer type, which employs an open waveguide.

According to a feature of the invention a gas laser, particularly of the excimer type, has an open waveguide, in which a discharge cell is provided, where the length of the discharge cell as measured along the direction of the optical axis of the open waveguide is greater than the width of the aforesaid cell.

According to another feature of the invention gas flow means serve to move gas to and through the open waveguide in the region of the discharge cell.

According to a still further feature of the invention a microwave excitation source serves to pump the laser medium and the microwave source delivers microwave energy to the region of the discharge cell.

According to yet another feature of the invention suitable means serve for directing microwave energy to and through the aforesaid discharge cell to excite the laser medium in the region of the discharge cell.

In one embodiment, the E-field is zero at the walls along the shorter side of the microwave chamber at the lowest order TE-mode.

In accordance with the instant invention, an excimer laser is provided in which an open waveguide is employed. The open waveguide has top and bottom slabs which define the waveguide. The slabs are preferably made of a suitable dielectric material which is either chemically neutral with respect to the excimer gas medium employed, or suitable for use without substantial degradation of the slab or its dielectric properties. Examples of gas mixtures employed in excimer lasers are Xenon, Xenon-Chloride, Krypton-Fluoride and Argon-Fluoride, all of which are corrosive and all of which will destroy most metals in a short time. Dielectric materials useful as slab material to form the open waveguide upper and lower surfaces are well known in the art. However, examples of such materials are fused quartz for XeCl and other chloride gases, and alumina for flouride based gases.

In accordance with another aspect of the invention, a discharge cell is contained within a section of the open waveguide assembly. The discharge cell comprises the upper and lower slabs of the waveguide, a gas flow chamber for moving the gas medium through the space between the upper and lower waveguides in a direction transverse to the optical axis, and a microwave chamber which intersects and is positioned so that the microwaves generated by a microwave generator are directed to and through the open waveguide in a direction which is both transverse to the optical axis, and at right angles to the direction of gas flow.

These and other features of the invention are more particularly set forth in the claims. Other objects and advantages of the invention will become apparent from the following detailed description of the preferred embodiment of the invention when read in light of the following drawings.

BRIEF DESCRIPTION OF THE DRAWINGS

The drawings depict preferred embodiments of the invention and use like numerals to refer to like parts.

DESCRIPTION OF THE PREFERRED EMBODIMENT

Figure 1:
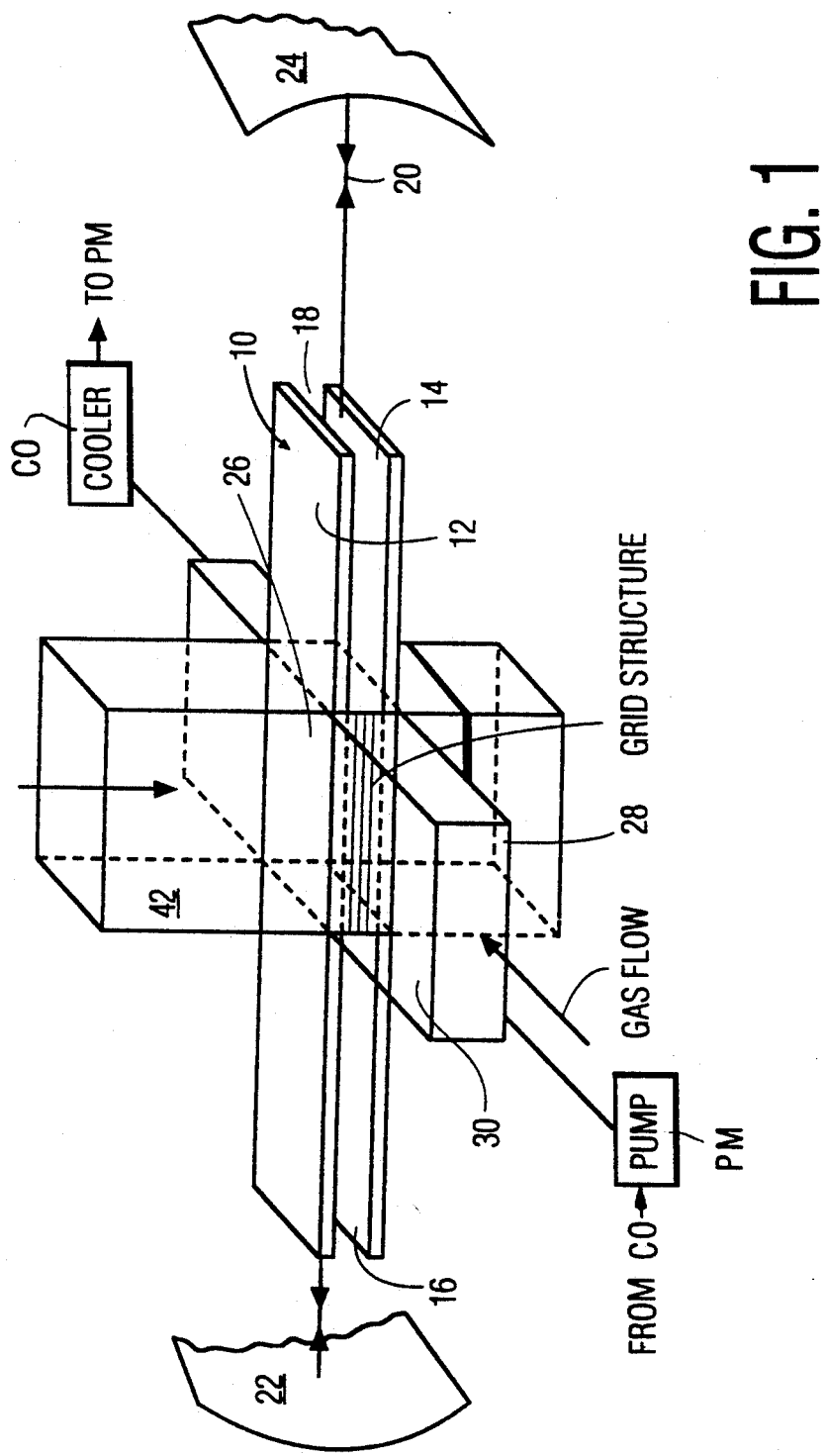
FIG. 1 is a perspective view of the preferred embodiment of the invention.

In FIG. 1, an open waveguide 10 includes an upper slab 12 and a lower slab 14. The open waveguide is open along sides 16 and 18, and its optical axis is denoted by the numeral 20. Conventional reflecting mirrors 22, 24 appear at either end of the open waveguide along the optical axis for reasons and for purposes well known to the art.

In this preferred embodiment, a discharge cell 26 is formed by the upper and lower slabs 12 and 14, and by the intersection of a gas flow chamber 28 with the upper and lower slabs. For best results, the gas flow chamber is rectangular in shape with the longer side 30 thereof parallel to the surface of the slabs 12 and 14.

Gas flow is provided to and through the discharge cell to continually change the gas medium within the discharge cell during operation of the laser. Gas flow is preferably provided in a direction transverse to the optical axis 20 so that the flow of gas is to and through the open waveguide only in the small region defined by the discharge cell. The remainder of the open waveguide receives no gas flow, and is employed to remove high divergence optical wavelengths to thus improve the quality of the laser beam, and to increase the extraction efficiency of the laser.

Figure 2:
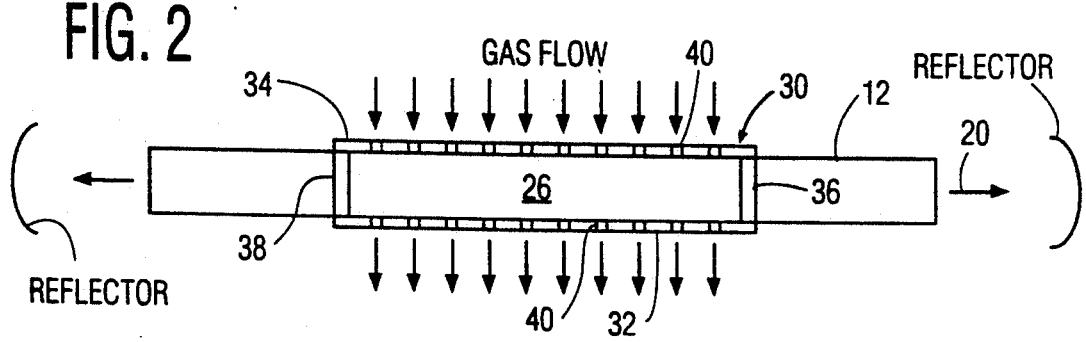
FIG. 2 is a sectional view of the embodiment of FIG. 1 taken along line II—II thereof.

The gas flow chamber appears more specifically shown in FIG. 2. The gas flow chamber 30 comprises a pair of side walls 32 and 34 connected by a pair of open braces 36 and 38. The gas flow chamber may be made of any conventional material which will contain the typical corrosive gas medium employed in an excimer laser. The gas medium is pumped through the gas chamber 30 to and through the discharge cell by conventional pumping means (not shown), and the gas medium moves through a plurality of openings 40 provided in both side walls 32 and 34 of the gas chamber, thus permitting the excimer gas medium to move to and through the discharge cell. Conventional means for collecting the used gas medium are also employed (not shown).

Side walls 36, 38 may be solid instead of braces, provided that the solid side walls have one of more openings therein to permit the laser beam to exit the discharge cell in an unobstructed manner.

The use of microwaves to excite the laser gas medium is known. However, microwave excitation, typically used to initiate lasing action by the art, has provided the microwave energy to the typical hollow waveguide assemblies now commonly used in a direction parallel to the optical axis. The hollow waveguide itself has been employed as the cavity or chamber through which the microwaves travel. Losses are incurred along the hollow waveguide, excitation is difficult to achieve, the construction of the hollow waveguide is more complex than would otherwise be the case, and servicing and adjustment in the field are made more difficult. It is also more difficult to adjust and control the position of the maximum amplitude of the E-field in the hollow waveguide, and more difficult to isolate the volume of the gas plasma on which the excitation energy acts since it typically occupies a large volume of the hollow waveguide.

Figure 3:
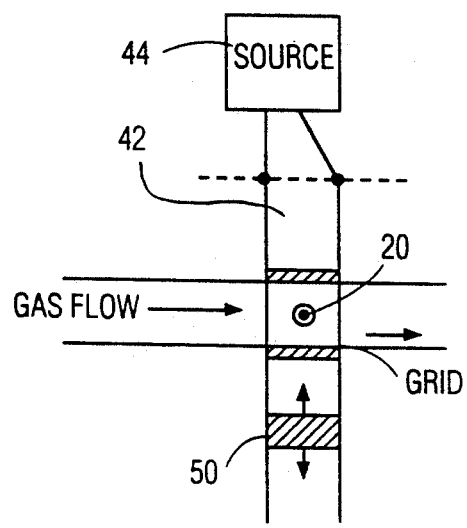
FIG. 3 is a sectional view of the embodiment of FIG. 1 taken along line III—III thereof.
Figure 4:
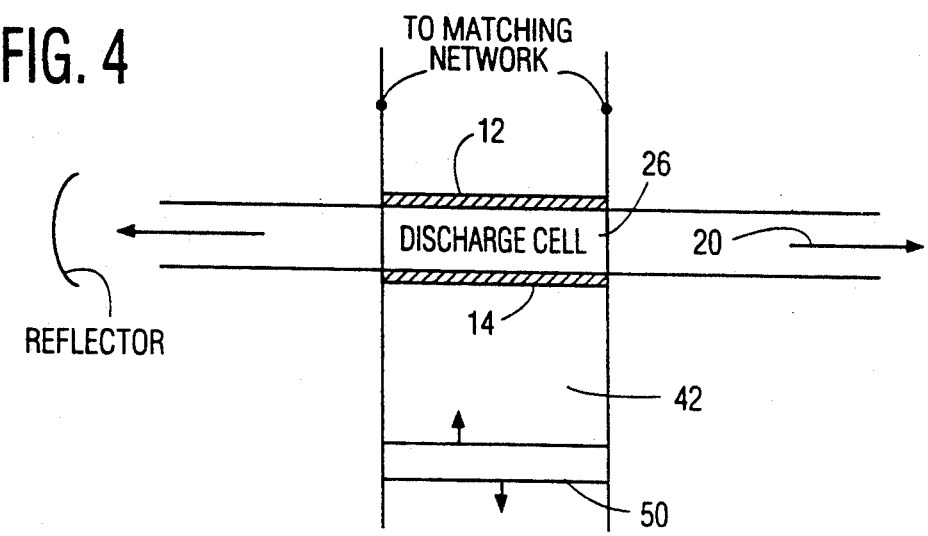
FIG. 4 is a sectional view of the embodiment of FIG. 1 taken along line IV—IV thereof.

The open waveguide structure of the present invention, in which a discharge cell is defined, permits the microwave excitation pulse to be concentrated within the discharge cell, which is a relatively small volume containing the gas medium. Accordingly, a microwave chamber 42 is provided which intersects the volume of the discharge cell. A conventional source of microwaves 44 is connected to the microwave chamber and a conventional impedance matching circuit is also employed (not shown). See FIG. 3.

The microwave chamber is of the same shape and internal cross section dimensions of length and width as that of the discharge cell, substantially as shown in FIG. 1. The microwave excitation source is positioned to deliver microwave pulses normal to the surface of the upper and lower slabs 12 and 14, which then pass through the discharge cell volume, substantially as shown. For best results, the microwave discharge chamber 42 extends through the discharge cell 26 and exits the other side of thereof, thus providing further microwave channeling after the pulse exits the discharge chamber 26.

Having a substantial portion of the microwave chamber outside the discharge cell 26 and above and below the open waveguide structure provides for easier assembly, and in particular allows easy and simple adjustment of the point at which the maximum amplitude of the E-field standing wave occurs. To adjust the point at which the E-field standing wave maximum amplitude occurs, a short 50 is provided downstream at a selected point after the microwaves have passed through the discharge cell. The short forces the E-field to go to zero at the location of the short 50.

To adjust the standing wave, the short 50 is made movable along the microwave chamber. Conventional means, such as a slit in the side of the microwave chamber allow access to the short connection and its adjustment along the microwave chamber.

Placing the microwave chamber such that the direction of microwave travel is normal to the slabs 12 and 14, makes the E-field of the microwave source parallel to the discharge walls of the discharge cell. In addition, for best results, the optical axis is parallel to the longer side of the microwave chamber and discharge cell. In this instance, the short is best positioned along the smaller dimension of the microwave chamber walls. The source of microwaves can be provided either by a X-band source or an anode-cathode system outside the microwave chamber, or any other suitable source.

According to an embodiment of the invention, the microwave chamber extends through the slabs 12 and 14 and provides the walls of the discharge cell, instead of the gas flow chamber. In this instance, the microwave discharge chamber is provided with a grid like structure in the region of the discharge cell to permit the gas from the gas flow chamber to flow to and through the discharge cell.

According to an embodiment of the invention, the microwave source has a rise time of from about 10 ns to about three of four time 10 ns. Also for best results, the location of the short is adjusted so that the maximum amplitude of the voltage standing wave occurs at the position of the discharge cell.

The use of an open waveguide structure permits the construction of an easy to maintain and relatively simple excimer laser. In addition, good discrimination against high incidence beam angles to obtain a more coherent beam at the output ends of the waveguide is also obtained. Still further, the replacement of parts in use is simplified, along with servicing of the laser, when an open waveguide structure is employed.

The use of an open waveguide structure is particularly well suited to the use of a microwave source for the initial excitation of the excimer gas medium. It is in addition well suited to the use of means for flowing gas through the waveguide, which aids in the removal of heat, and continually refreshes the gas medium, thus decreasing the waiting time between pulses.

The use of a discharge cell in connection with excimer lasers provides particular benefits. First, the discharge cell is a defined area, which can be made rather small in comparison to the overall length of the open waveguide, thus confining the initiation of lasing action to a small region of the waveguide.

In a typical laser, such as one that uses a hollow waveguide, the entire volume of the hollow waveguide is employed to move gas medium to and through the laser. More gas is required, its extraction efficiency is low, it is difficult to build and repair, and it is difficult to service and adjust in the field. In addition, microwave pumping is more difficult to achieve and more difficult to control and adjust to obtain peak efficiency.

In using the discharge cell of the present invention, the open waveguide structure permits a small section of the open waveguide, as measured along the optical axis, to be employed for the purpose of concentrating the desired components to obtain effective and efficient lasing action. The gas flow chamber is a hollow chamber which, for best results, is inserted so that the gas flow is between the upper and lower slab in a direction transverse to the optical axis, and parallel to the surfaces of the upper and lower slabs. The gas flow chamber is hollow and is providing with an opening along the optical axis on two sides thereof to permit the laser beam to exit the chamber and to travel along the optical axis of the waveguide.

In one embodiment of the invention the gas flow chamber is a complete unit in and of itself and fits within the volume defined by the upper and lower slabs, or alternatively, the upper and lower slabs define the upper and lower regions of the gas flow chamber in the area bounded by the upper and lower open waveguide slabs. In this manner, the "active" section of the open waveguide is confined to relatively small section of the waveguide. The remainder of the waveguide located outside the discharge cell area is employed as intended, namely as a conduit for the beam, its enhancement, the removal of heat, and the selective control and removal of high divergence optical wavelengths, thus increasing the output power of the beam.

In this invention, excitation means, comprising a microwave energy source, are positioned to deliver microwave energy to pump the laser medium in the region of the discharge cell. In one embodiment, the excitation means includes a microwave chamber or cavity which has an internal cross section of substantially the same dimensions as the discharge cell. Preferably, the microwave chamber or cavity is positioned to deliver microwave energy and to irradiate the entire cross section of the flowing gas medium, thus confining the action of the microwave energy to the small volume of the discharge cell.

In one embodiment, the microwave chamber is positioned so that it intersects the upper and lower slabs of the open waveguide assembly. In this manner, the microwave pumping energy can pass directly through the discharge cell and excite the gas medium flowing therein. And, because a substantial section of the microwave chamber is positioned external to the discharge cell, and external to the open waveguide structure, it is relatively easy to build, to adjust, and to service in the field.

In one embodiment, the length of the discharge cell, defined as the distance measure along the optical axis, is greater than the width, herein defined as the distance measured along the surface of the open waveguide slabs transverse to the optical axis. A conventional E-field is supplied, and a short is placed in the microwave chamber and is positioned on the downstream side of the open waveguide with reference to the direction of propagation of the microwaves. The short achieves a high overvoltage for the initiation of gas discharge and enhances the effectiveness of the excimer laser. The location of the short along the microwave chamber is made adjustable so that the maximum amplitude of the voltage standing wave occurs at the position of the discharge cell.

Other and further modifications may be made to the invention as described hereinabove, and to the embodiment shown and described herein. It is intended to cover all such modifications which fall within the spirit and scope of the invention as defined in the claims appended hereto.

I claim:

1. In a gas laser, the improvement comprising an open waveguide comprising an upper slab and a lower slab extending parallel to each other and being spaced from each other a selected distance, the open waveguide having an optical axis located between the upper and lower slab, said optical axis being parallel to the upper and lower slabs and extending in a first direction, means for flowing a laser gas medium between the upper and lower slabs in a second direction at substantially right angles to the optical axis to replenish and provide a source of fresh laser gas medium between the upper and lower slabs, excitation means for exciting the laser gas medium to a level sufficient to cause the laser gas medium to lase, the excitation means comprising microwave excitation means positioned to provide microwave energy to a region defining a defined by the discharge cell, the direction of said microwave energy being along a third direction at substantially right angles to the first and second direction, and means for generating an adjustable E-field along said microwave excitation means in the direction of travel of said microwaves.

2. The gas laser according to claim 1 further comprising a discharge cell through which the aforesaid gas medium flows, said discharge cell being bounded by the upper and lower slabs and by means for preventing the flow of gas in said first direction.

3. The gas laser according to claim 2 in which the upper and lower slabs extend beyond the discharge cell on either side thereof in a direction along the optical axis.

4. The gas laser according to claim 2 in which the dimension of the said discharge cell along the optical axis is greater than the dimension of the said discharge cell in a direction at right angles to the optical axis.

5. The gas laser according to claim 1 in which the microwave excitation means further comprises a microwave chamber to confine and direct the microwaves to and through the discharge cell.

6. The gas laser according to claim 5 in which the said microwave chamber cross section is rectangular and the longer dimension of the said microwave chamber cross section is parallel to the optical axis.

7. The gas laser according to claim 5 or 6 wherein said adjustable E-field includes short means located in said microwave chamber below the open waveguide having reference to the direction of the microwaves, and means for adjusting the location of said short means to generate a standing wave having maximum amplitude at the region of the discharge cell.

8. The gas laser according to claim 1 in which the gas medium is an excimer gas medium.

9. In an excimer gas laser, the improvement comprising an open waveguide, said open waveguide having an upper and a lower slab, said upper and lower slabs being spaced from each other, said open waveguide having an optical axis between and parallel to the aforesaid slabs, means for flowing excimer gas between the aforesaid slabs in a direction at substantially right angles to the optical axis, said means for flowing said gas comprising a gas flow chamber for confining and directing the flow of gas to and through the open waveguide, the confluence of the upper and lower slabs and the gas flow chamber in the region between the upper and lower slabs defining a discharge cell in which lasing action is initiated, and microwave excitation means for supplying microwave energy to the discharge cell to initiate said lasing action, the microwave excitation means comprises a microwave chamber for directing microwave energy to and through the upper and lower slabs and through the discharge cell, said microwave chamber extending below the aforesaid slabs with reference to the direction of microwave travel, said microwave chamber confining said microwaves to travel in a direction substantially at right angles to the optical axis and at substantially right angles to the direction of gas flow; short means located in said microwave chamber below the aforesaid slabs, and means for generating an E-field in said microwave chamber in which the largest amplitude of the E-field is located in the region of the discharge cell.

10. The excimer gas laser according to claim 9 in which the means for creating an E-field in the microwave chamber in which the largest amplitude of the E-field is positioned in the region of the discharge cell comprises means for adjusting the location of the aforesaid short means to thereby adjust the position at which the maximum amplitude of the E-field occurs in said microwave chamber.

11. The excimer gas laser according to claim 10 in which the microwave chamber is rectangular, and in which the cross section of said microwave chamber has its longer dimension parallel to the optical axis.

12. In a gas laser, the improvement comprising an open waveguide comprising an upper slab and a lower slab extending parallel to each other and being spaced from each other a selected distance, the open waveguide having an optical axis located between the upper and lower slab, said optical axis being parallel to the upper and lower slabs and extending in a first direction, means for flowing a laser gas medium between the upper and lower slabs in a second direction at substantially right angles to the optical axis to replenish and provide a source of fresh laser gas medium between the upper and lower slabs, and excitation means for exciting the laser gas medium to a level sufficient to cause the laser gas medium to lase, a discharge cell through which the aforesaid gas medium flows, said discharge cell being bounded by the upper and lower slabs and by means for preventing the flow of gas in said first direction, the upper and lower slabs extending beyond the discharge cell on either side thereof in a direction along the optical axis, the excitation means comprising microwave excitation means, the microwave excitation means being positioned to provide microwave energy to the region defined by the discharge cell, the direction of said microwave energy being along a third direction at substantially right angles to the first and second direction, the microwave excitation means further comprising a microwave chamber to confine and direct the microwaves to and through the discharge cell, said microwave chamber cross section being rectangular and the longer dimension of the said microwave chamber cross section being parallel to the optical axis, means for generating an E-field along said microwave chamber in the direction of travel of said microwaves, and short means located in said microwave chamber below the open waveguide having reference to the direction of the microwaves, and means for adjusting the location of said short means to generate a standing wave having maximum amplitude at the region of the discharge cell to produce and adjustable E-field.

13. The gas laser according to claim 12 in which the gas medium is an excimer gas medium.

* * * * *